(12) United States Patent
Jaaskelainen et al.

(10) Patent No.: US 9,909,951 B2
(45) Date of Patent: Mar. 6, 2018

(54) APPARATUS AND METHOD FOR CHARACTERIZATION OF FBG RELLECTOR ARRAY

(71) Applicant: Halliburton Energy Services, Inc, Houston, TX (US)

(72) Inventors: Mikko Jaaskelainen, Katy, TX (US); Han-Sun Choi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/524,556

(22) PCT Filed: Dec. 23, 2014

(86) PCT No.: PCT/US2014/072250
§ 371 (c)(1),
(2) Date: May 4, 2017

(87) PCT Pub. No.: WO2016/105401
PCT Pub. Date: Jun. 30, 2016

(65) Prior Publication Data
US 2017/0328808 A1    Nov. 16, 2017

(51) Int. Cl.
*G01N 21/00* (2006.01)
*G01M 11/00* (2006.01)
*G01D 5/353* (2006.01)
*G08C 15/06* (2006.01)

(52) U.S. Cl.
CPC ........... *G01M 11/31* (2013.01); *G01D 5/3539* (2013.01); *G08C 15/06* (2013.01)

(58) Field of Classification Search
CPC . G01M 11/31; G01D 5/3539; G01D 5/35316; G01D 5/35387; G02B 6/2932; G08C 15/06
See application file for complete search history.

(56) References Cited

U.S. PATENT DOCUMENTS

| 6,285,806 B1 | 9/2001 | Kersey et al. |
| 6,571,027 B2 * | 5/2003 | Cooper .............. G01D 5/35383 250/227.19 |
| 7,060,967 B2 | 6/2006 | Thingbo et al. |

(Continued)

FOREIGN PATENT DOCUMENTS

| WO | WO 2014179073 A1 | 11/2014 |
| WO | WO 2015105475 A1 | 7/2015 |

OTHER PUBLICATIONS

Han-Sun Choi, Characterization of FBG Reflector Arrays by Wavelength Tuning of a Pulsed DFB Laser 14th International Conference on Optical Fiber Sensors, Oct. 2000 (Venice, Italy).

*Primary Examiner* — Kara E Geisel
*Assistant Examiner* — Maurice Smith
(74) *Attorney, Agent, or Firm* — Gilliam IP PLLC

(57) ABSTRACT

A system and method for evaluating individual Fiber Bragg Grating (FBG) sensors in a multiplexed acoustic sensor system, the system comprising: a broadband pulsed source; a circulator that passes a laser pulse to a multiplexed series of N FBG sensors and one reference Fresnel reflector, wherein said circulator also receives a return N+1 reflection pulse train from the N FBG sensors and one reference Fresnel reflector; and an optical switch that receives the return N+1 reflection pulse train from the N FBG sensors and one reference Fresnel reflector.

7 Claims, 3 Drawing Sheets

(56) References Cited

U.S. PATENT DOCUMENTS

| | | | |
|---|---|---|---|
| 9,110,259 B1* | 8/2015 | Black | G02B 6/2938 |
| 2006/0181711 A1* | 8/2006 | Waagaard | G01D 5/35312 |
| | | | 356/478 |
| 2007/0051882 A1 | 3/2007 | Childers | |
| 2010/0315232 A1 | 12/2010 | Lamont | |
| 2014/0152995 A1* | 6/2014 | Dong | G01L 1/246 |
| | | | 356/477 |
| 2015/0036134 A1* | 2/2015 | Saitoh | G01L 1/246 |
| | | | 356/300 |

* cited by examiner

APPARATUS AND METHOD FOR CHARACTERIZATION OF FBG RELLECTOR ARRAY

BACKGROUND

Low reflectivity broadband fiber Bragg gratings are used for WDM/TDM hybrid multiplexed acoustic sensor systems due to their capability of being made for large scale multiplexing in single fiber. A single FBG is easy to characterize in terms of its peak reflectivity and spectral profile using a broadband source and an optical spectrum analyzer. For a multiplexed sensor cable, cable designers would prefer avoiding splicing due to the inconvenience and increased loss that is harmful for sensor array performance, and potentially weakened tensile strength.

To write many FBG's in series for continuous length of single fiber monitoring each FBG's reflectivity profile, and to evaluate the array during/after sensor cable fabrication using the fiber, and even after field deployment of the sensor cable, a proper device and procedure is desired to evaluate individual FBGs in the array.

For an evaluation of an array, a setup with a high coherent scanning laser and spectrum analyzer has been used with a reference reflector which is usually a Fresnel reflector of ~3.4% reflectivity. Acquired data is usually quite noisy for a variety of reasons, and the evaluation results, even with averaged data, can be unreliable. With all the best effort, even the reference Fresnel reflections showed ripples, which supposed to have flat top over wavelength variations. It is suspected that the ripples are contributed by interferometric noise due to the high coherent source with multiple parasite reflections in the system.

There is a growing need to develop a broadband (at least tens of nm wide) pulsed source for some applications. One is for a multiplexed VIP MOMS sensor system, and another is multiplexed EFPI sensor demodulator system.

If a broadband pulsed source is used for an FBG reflector array evaluation system, the evaluation speed should be potentially much faster without needing the scanning of laser, and the evaluation reliability should be increased due to more stable data without the interferometric noises due to the low coherent broadband source even with the presence of multiple parasite reflections in the system.

This disclosure presents a system configuration and procedure that could be used during an FBG reflector array manufacturing, as well as field evaluations.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Figure 1:
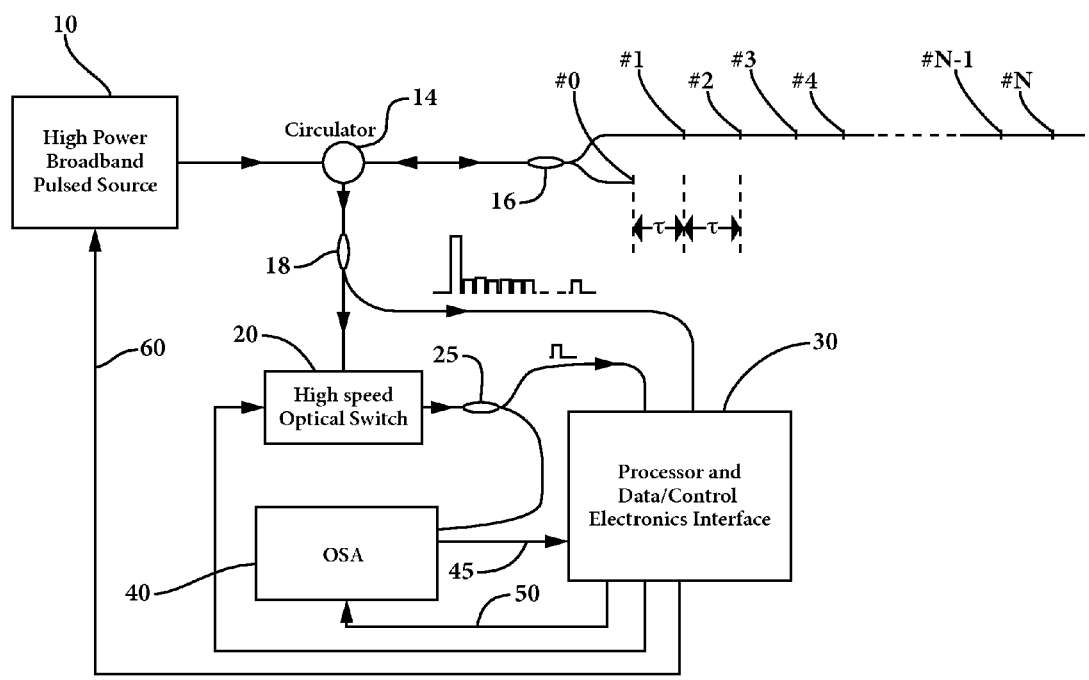
FIG. 1 is a schematic diagram of the apparatus for carrying out the characterization of a Fiber Bragg Grating reflector array.

FIG. 1 is the schematic diagram of an system for carrying out a characterization of an FBG reflector array. A high power broadband pulsed source 10 launches pulses toward a sensor FBG reflector array (#1, #2, #3, . . . #N) through a circulator 14. Preceding the FBG reflector array a splitter 16 directs the pulses into the reflector array or to a Fresnel reflector #0. For better reference reflectivity, an exact 50%-50% splitter should be carefully chosen among many 3 dB couplers. It is also useful in calculation to have the same path difference $\tau$ between the Fresnel reflector and the FBG #1 as the path difference between the other FBGs in the array.

Figure 2:
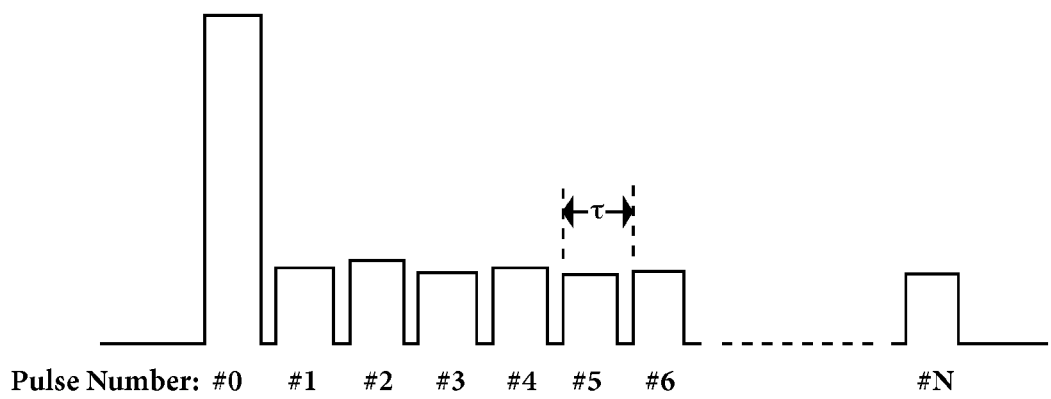
FIG. 2 represents a return pulse train from the array and the reference reflector of this disclosure.

The returning pulse train includes N+1 pulses that return to circulator 14 and are directed by another 3dB splitter tap coupler to either an optical switch 20 or a processor and data/control electronics and interface device 30. The #0 pulse from the broad Fresnel reflector, which includes the full spectrum component, will be much larger than the #1 . . . #N pulses from the FBGs, because pulses from the FBG's have narrowed-down spectra (typically ~2-4 nm). This is shown in FIG. 2, which shows the acquired spectra from #0 to #N reflectors. The optical switch 20 works as an optical gating device to choose only one pulse for its spectrum acquisition. Before and after passing through optical switch 20, ~10% monitoring tap couplers 18, 25 are used to tap the pulse train (before) and the chosen pulse (after) for optical switch timing control purposes. The chosen pulse then passes to processor and data/control electronics and interface device 30.

The processor and data/control electronics and interface 30 is an opto-electronics box including computer and necessary interface circuits to other functional blocks in the system. It includes electronics and opto-electronic circuitry such as optical-to-electrical converters and photo-detectors. It receives both the complete optical pulse train and selected pulses and lets the other process elements know the timings needed to generate the correct timing pulse for a chosen channel. Device 30 also is captures and saves spectra from different channels and calculates real spectrum for each channel to send to a display (not shown).

An optical spectrum analyzer (OSA) 40 is used here to acquire spectra from different FBG's at different locations, for different time delays as a result, in the array. To choose a spectrum for a different delay, or different location, the optical switch 20 is used. In other words, optical switch 20 is used as a shutter to choose a TDM (time division multiplexed) channel, and the processor and data/control electronics and interface 30 communicates the switch opening time and duration to optical switch 20.

For the proper timing control for optical switch 20, the ~10% tap couplers 18, 25 are used before and after the optical switch, to monitor the pulse train from the array and the chosen pulse to the OSA 40.

For a chosen FBG reflector, the OSA 40 integrates the spectrum and sends it to the processor and data/control electronics and interface 30, and the timing of this action is also controlled by the control signal 50 from the processor and data/control electronics and interface 30. Depending on the integration time required, which is a function of optical power from each FBG, the processor and data/control electronics and interface 30 generates control signals to capture the spectra, and to trigger the optical switch 20 and broadband pulsed source 10.

Using a proper software/GUI, and with proper inputs including pulse period, pulse width, number of reflectors, and desired spectral resolution etc. for a specific FBG array, i×j numbers of spectral data are stored in memory in the processor and data/control electronics and interface 30.

Figure 3:
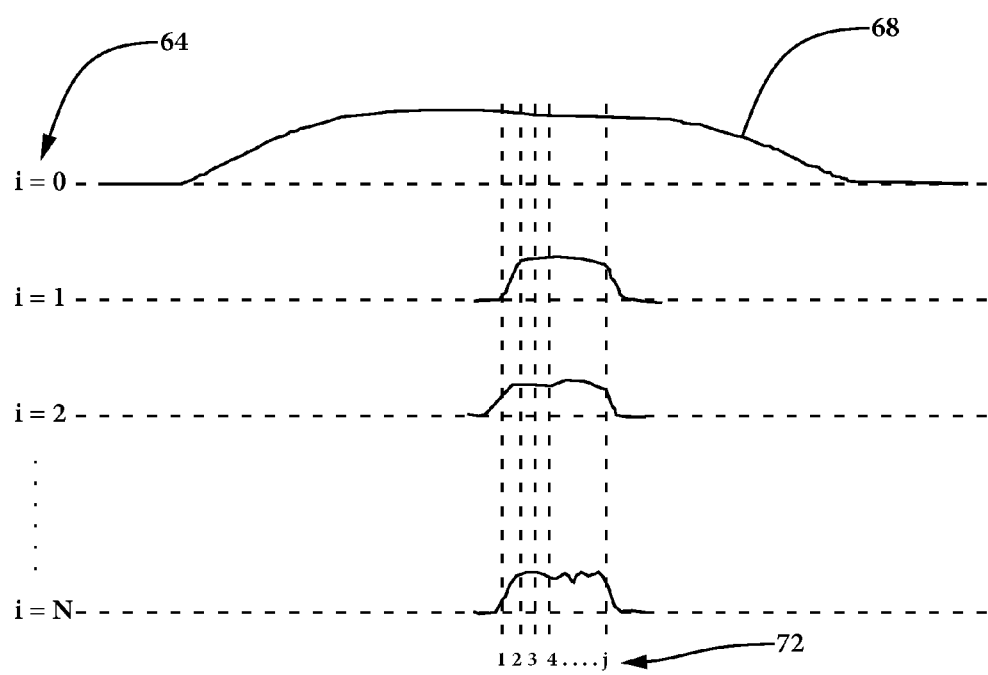
FIG. 3 illustrates an acquired spectra from #0 to #N reflectors. Optical power ij represents ith pulse's jth spectral component.

FIG. 3 illustrates an example of acquired spectra for N pulses. The #0 spectrum is from broadband Fresnel reflector of 3.4% and essentially it shows the source reflection profile that could be used as reference reflection to evaluate the FBG's in the array in sequence.

Previous reflectors and the loss between the reflectors affect all of the power spectral components from FBG reflectors, so the effect of those has to be compensated for to see the true reflectivity profile. If we define continuous length continuous length continuous length $P_{ij}$ as jth power spectral component for the ith pulse, call $Ra_{ij}$ as jth 'apparent' reflectivity spectral component for the same before calculating 'true' reflectivities, and call $R_{ij}$ as jth 'true' reflectivity spectral component for the same. Then following is the procedure to evaluate the true reflectivity profiles for #1~#N FBG's.

$$Ra_{ij} = \text{Reference Reflectivity} \times \frac{P_{ij}}{P_{0j}} = 0.034 \times \frac{P_{ij}}{P_{0j}} \quad (1)$$

Then, $$Ra_{ij} = R_{1j} \cdot X^2 \quad (2)$$

Where X is the fiber loss between reflectors which is:

$$X = 10^{-\frac{\alpha \cdot L}{10}} \quad (3)$$

Where α a is fiber loss per unit length (dB/Km) and L is fiber length between reflectors.

From (2), $$R_{1j} = \frac{Ra_{1j}}{X^2} \quad (4)$$

$$Ra_{2j} = R_{2j} \cdot (1 - R_{1j})^2 \cdot X^2 \quad (5)$$

$$Ra_{3j} = R_{3j} \cdot (1 - R_{2j})^2 \cdot (1 - R_{1j})^2 \cdot X^2 \quad (6)$$

$$Ra_{4j} = R_{4j} \cdot (1 - R_{3j})^2 \cdot (1 - R_{2j})^2 \cdot (1 - R_{1j})^2 \cdot X^2 \quad (7)$$

From (5), $$R_{2j} = \frac{Ra_{2j}}{(1 - R_{1j})^2 \cdot X^2} \quad (8)$$

From (5), and (6), $$R_{3j} = \frac{Ra_{3j}}{(1 - R_{2j})^2 \cdot X^2 \cdot (1 - R_{1j})^2 \cdot X^2} = \frac{R_{2j} \cdot Ra_{3j}}{Ra_{2j} \cdot (1 - R_{2j})^2 \cdot X^2} \quad (9)$$

Likewise from (6) and (7), $$R_{4j} = \frac{Ra_{4j}}{(1 - R_{3j})^2 \cdot X^2 \cdot (1 - R_{2j})^2 \cdot X^2 \cdot (1 - R_{1j})^2 \cdot X^2} = \frac{R_{3j} \cdot Ra_{4j}}{Ra_{3j} \cdot (1 - R_{3j})^2 \cdot X^2} \quad (10)$$

And so on. Therefore, $$R_{ij} = \frac{R_{(i-1)j} \cdot Ra_{ij}}{Ra_{(i-1)j} \cdot (1 - R_{(i-1)j})^2 \cdot X^2} \quad (11)$$

Without laser scanning time, the total evaluation time could be faster for this scheme. Furthermore, with the extremely low coherence length of the broadband source, getting more stable and reliable reflection spectra would be possible for more stable measurement.

Multiplexed fiber optic point acoustic sensing systems use low reflectivity broadband FBG reflector arrays for large scale multiplexing in a single continuous fiber. Compared to distributed acoustic sensor system (DAS), multiplexed point acoustic sensing system have a better signal to noise ratio, and do not suffer polarization/ensemble fading problems, making more reliable measurement possible. The proposed system and method provides a reliable and efficient FBG array evaluating system for FBG array manufacturing, sensor cable manufacturing using the array, and before and after field deployment of the sensor cable.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system for evaluating individual Fiber Bragg Grating (FBG) sensors in a multiplexed acoustic sensor system comprising:
   a. a broadband pulsed source;
   b. a circulator that passes the laser pulse to a multiplexed series of N FBG sensors and one reference Fresnel reflector; wherein said circulator also receives a return N+1 reflection pulse train from the N FBG sensors and one reference Fresnel reflector;
   c. an optical switch that receives the return N+1 reflection pulse train from the N FBG sensors and one reference Fresnel reflector;
   d. an optical spectrum analyzer that acquires spectra from the N FBG sensors at different time delays; and integrates the spectrum for each FBG;
   e. a processor and data control interface that receives the sequential spectrum of each of the N FBG's from the optical spectrum analyzer and provides timing control signals to the optical spectrum analyzer, the optical switch, and the broadband pulsed source.

2. The system for evaluating individual Fiber Bragg Grating (FBG) sensors in a multiplexed acoustic sensor system of claim 1 further comprising monitoring tap couplers before and after the optical switch to tap the reflection pulse train before and a chosen pulse after for optical switch timing control purposes.

3. A method for evaluating individual Fiber Bragg Grating (FBG) sensors in a multiplexed acoustic sensor system comprising;
   a. launching pulses from a broadband pulsed source toward an array of FBG reflectors;
   b. directing approximately 50% of the launched pulses into the array of FBG reflectors and the remainder to a Fresnel reflector;
   c. collecting a reflected pulse train from the FBG reflectors and the Fresnel reflector and directing these to an optical switch;
   d. directing the reflected pulse train in a controlled manner to an optical spectrum analyzer (OSA) to acquire the spectra from different FBG's for different time delays;
   e. integrating the spectrum for chosen FBG reflectors and forwarding them to a processor and data/control interface;
   f. generating control signals and transmitting them to the optical spectrum analyzer, the optical switch, and the broadband pulsed source;
   g. storing the acquired spectrum data in memory in the processor and data/control electronics and interface.

4. The method for evaluating individual Fiber Bragg Grating (FBG) sensors in a multiplexed acoustic sensor system of claim 3 wherein the optical switch is used as a shutter to choose a TDM (time division multiplexed) channel.

5. The method for evaluating individual Fiber Bragg Grating (FBG) sensors in a multiplexed acoustic sensor system of claim 3 wherein the processor and data/control electronics and interface communicates the optical switch opening times and duration to the optical switch.

6. The method for evaluating individual Fiber Bragg Grating (FBG) sensors in a multiplexed acoustic sensor system of claim 3 wherein monitoring tap couplers are used to tap the reflected pulse train to the optical switch and a chosen pulse from the optical switch for optical switch timing control purposes.

7. The method for evaluating individual Fiber Bragg Grating (FBG) sensors in a multiplexed acoustic sensor system of claim 3 wherein for a chosen FBG reflector, the optical spectrum analyzer integrates the spectrum and sends it to the processor and data/control electronics and interface, and the timing of this action is controlled by the control signal from the processor and data/control electronics and interface.

* * * * *